(12) United States Patent
Okamatsu et al.

(10) Patent No.: US 9,598,563 B2
(45) Date of Patent: Mar. 21, 2017

(54) RUBBER COMPOSITION FOR TIRES, AND PNEUMATIC TIRE MANUFACTURED USING SAME

(71) Applicant: The Yokohama Rubber Co., LTD., Minato-ku, Tokyo (JP)

(72) Inventors: Takahiro Okamatsu, Hiratsuka (JP); Toshihiko Arita, Sendai (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/915,607

(22) PCT Filed: Aug. 22, 2014

(86) PCT No.: PCT/JP2014/072051
§ 371 (c)(1),
(2) Date: Feb. 29, 2016

(87) PCT Pub. No.: WO2015/029909
PCT Pub. Date: Mar. 5, 2015

(65) Prior Publication Data
US 2016/0200903 A1    Jul. 14, 2016

(30) Foreign Application Priority Data
Aug. 30, 2013  (JP) ................................. 2013-180445
Mar. 6, 2014   (JP) ................................. 2014-044072

(51) Int. Cl.
C08K 9/00 (2006.01)
C08L 9/06 (2006.01)
B60C 1/00 (2006.01)
C08L 7/00 (2006.01)
C08L 9/00 (2006.01)
C08L 53/00 (2006.01)
C08J 3/22 (2006.01)
C08F 2/44 (2006.01)
C08F 293/00 (2006.01)

(52) U.S. Cl.
CPC ...... *C08L 9/06* (2013.01); *B60C 1/00* (2013.01); *B60C 1/0016* (2013.04); *C08J 3/226* (2013.01); *C08L 7/00* (2013.01); *C08L 9/00* (2013.01); *C08L 53/00* (2013.01); *C08F 2/44* (2013.01); *C08F 293/00* (2013.01); *C08J 2309/00* (2013.01); *C08J 2453/00* (2013.01)

(58) Field of Classification Search
CPC ............ C08G 81/022; C08L 9/06; C08L 7/00
See application file for complete search history.

(56) References Cited

U.S. PATENT DOCUMENTS

| | | | |
|---|---|---|---|
| 2002/0179218 A1 | 12/2002 | Pierre et al. | |
| 2002/0183467 A1 | 12/2002 | Windisch et al. | |
| 2004/0167276 A1 | 8/2004 | Windisch et al. | |
| 2006/0021688 A1* | 2/2006 | Sandstrom ............... | B60C 1/00 152/209.4 |

FOREIGN PATENT DOCUMENTS

| | | |
|---|---|---|
| JP | 2002-201333 | 7/2002 |
| JP | 2002-356557 | 12/2002 |
| JP | 2003-089729 | 3/2003 |
| JP | 2003-531257 | 10/2003 |
| JP | 2006-274049 | 10/2006 |
| JP | 2012-172137 | 9/2010 |
| JP | 2013-095690 | 5/2013 |
| JP | 2014-105293 | 6/2014 |
| JP | 2014-105294 | 6/2014 |
| WO | WO 01/81439 | 11/2001 |
| WO | WO 2014/011603 | 1/2014 |

OTHER PUBLICATIONS

Toshihiko, "Efficient production of block copolymer coated ceramic nanoparticles by sequential reversible addition fragmentation chain transfer polymerization with particles," chemistry letters, vol. 42, No. 8, pp. 801-803, May 31, 2013.*

* cited by examiner

*Primary Examiner* — Hannah Pak
(74) *Attorney, Agent, or Firm* — Thorpe North & Western

(57) ABSTRACT

The present technology is a rubber composition for a tire comprising: a diene rubber; and a composite silica comprising a block copolymer and silica, the block copolymer comprising a first block obtained by polymerizing a first monomer containing at least a (meth)acrylate having a hydroxyl group and a second block obtained by polymerizing at least one type of a second monomer selected from the group consisting of styrene, derivatives thereof, and isoprene; the composite silica being produced in an organic solvent in the presence of the silica; and an amount of the composite silica being from 10 to 200 parts by mass per 100 parts by mass of the diene rubber; and a pneumatic tire using the same.

18 Claims, 2 Drawing Sheets

RUBBER COMPOSITION FOR TIRES, AND PNEUMATIC TIRE MANUFACTURED USING SAME

TECHNICAL FIELD

The present technology relates to a rubber composition for a tire and a pneumatic tire using the same.

BACKGROUND ART

Conventionally, in order to improve the dispersibility or the like of silica in a rubber composition for a tire containing silica, it has been proposed to use a silica which has been surface-treated with a silane coupling agent or the like (for example, JP 2012-172137 A).

However, the present inventors discovered that there is room for improvement in the rubber physical properties such as the modulus, fracture characteristics, low heat build-up (low rolling resistance), abrasion resistance, or impact resilience of rubber compositions for tires containing silica treated with silane coupling agents. The cause of this may lie in the fact that when the functional groups of a silane coupling agent react with rubber to form a bond, such a bond does not contribute to the stretching of the rubber.

SUMMARY

The present technology provides a rubber composition for a tire having excellent rubber physical properties.

The present technology provides the following rubber composition for a tire and a pneumatic tire using the same.

1. A rubber composition for a tire comprising: a diene rubber; and a composite silica comprising a block copolymer and silica, the block copolymer comprising a first block obtained by polymerizing a first monomer containing at least a (meth)acrylate having a hydroxyl group and a second block obtained by polymerizing at least one type of a second monomer selected from the group consisting of styrene, derivatives thereof, and isoprene; the composite silica being produced in an organic solvent in the presence of the silica; and an amount of the composite silica being from 10 to 200 parts by mass per 100 parts by mass of the diene rubber.

2. The rubber composition for a tire according to 1 described above, wherein the first block covers a surface of the silica.

3. The rubber composition for a tire according to 1 or 2 described above, wherein the second block is dispersed in the diene rubber.

4. The rubber composition for a tire according to any one of 1 to 3 described above, wherein the first block of the composite silica is adsorbed to a surface of the silica.

5. The rubber composition for a tire according to any one of 1 to 4 described above, wherein an amount of the block copolymer is from 2 to 50 mass % in the composite silica.

6. The rubber composition for a tire according to any one of 1 to 5 described above, wherein the silica has a silanol group.

7. The rubber composition for a tire according to any one of 1 to 6 described above further comprising a filler (excluding the composite silica).

8. The rubber composition for a tire according to any one of 1 to 7 described above further comprising a silane coupling agent.

9. The rubber composition for a tire according to any one of 1 to 8 described above, wherein a number average molecular weight of the block copolymer is from 1,000 to 1,000,000.

10. The rubber composition for a tire according to any one of 1 to 9 described above, wherein a molecular weight distribution of the block copolymer is from 1.1 to 3.0.

11. The rubber composition for a tire according to any one of 1 to 10 described above, wherein the composite silica is produced by polymerizing the block copolymer in the organic solvent in the presence of the silica or is produced by mixing the silica and the block copolymer in the organic solvent.

12. The rubber composition for a tire according to any one of 1 to 11 described above, wherein the block copolymer is produced by living radical polymerization.

13. The rubber composition for a tire according to any one of 1 to 12 described above, wherein the first monomer is polymerized in the organic solvent in the presence of the silica.

14. The rubber composition for a tire according to any one of 1 to 12 described above, wherein the composite silica is produced by a production method comprising: a polymerization step of producing the block copolymer; and a mixing step of mixing the block copolymer produced by the polymerization step and the silica in the organic solvent.

15. A pneumatic tire produced by using the rubber composition for a tire described in anyone one of 1 to 14 described above.

The rubber composition for a tire and the pneumatic tire of the present technology have excellent rubber physical properties.

DETAILED DESCRIPTION

Figure 1:
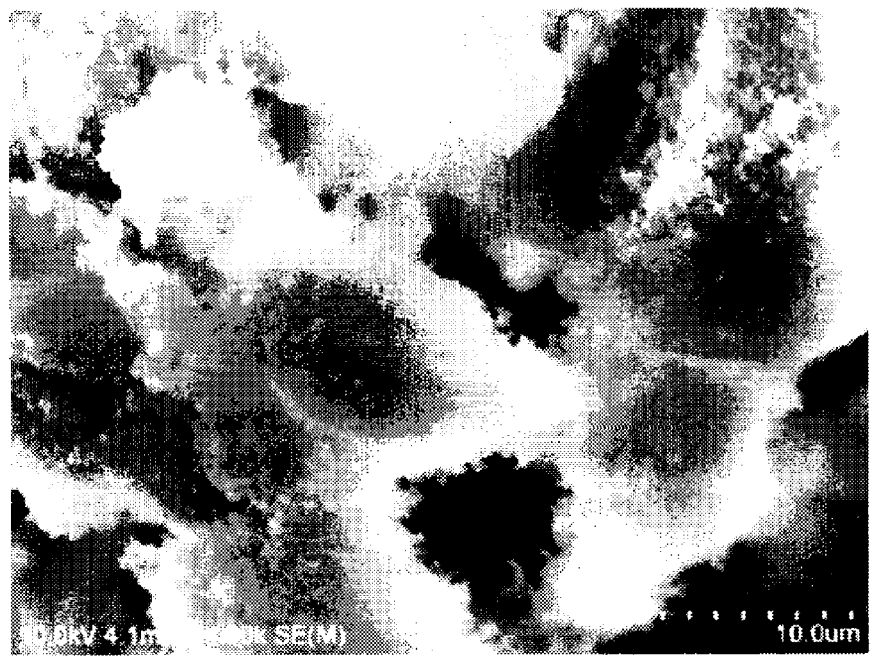
FIG. 1 is a photograph taken when observing the silica used to produce a composite silica in a working example of the present technology under a magnification of 4,000× with a transmission electron microscope.

The present technology will be described in detail hereinafter.

First, the rubber composition for a tire of the present technology (rubber composition of the present technology) is a rubber composition for a tire comprising: a diene rubber; and a composite silica comprising a block copolymer and silica, the block copolymer comprising a first block obtained by polymerizing a first monomer containing at least a (meth)acrylate having a hydroxyl group and a second block obtained by polymerizing at least one type of a second monomer selected from the group consisting of styrene, derivatives thereof, and isoprene; the composite silica being produced in an organic solvent in the presence of the silica; and an amount of the composite silica being from 10 to 200 parts by mass per 100 parts by mass of the diene rubber.

Since the composite silica of the rubber composition of the present technology comprises a block copolymer, it is possible to suppress the hydrophilicity of the silica and to impart hydrophobicity to the silica, and it is thought that this makes the silica readily compatible with the diene rubber and makes it possible to suppress the agglomeration of the silica. Specifically, it is thought that the first block of the block copolymer covers at least part or all of the surface of the silica so as to suppress the hydrophilicity of the silica, and that the composite silica having a second block imparts hydrophobicity to the silica.

In addition, since the second block of the block copolymer does not form a covalent bond or an ionic bond with the rubber, the surface of the composite silica is flexible, which is thought to contribute to the stretching of the rubber composition. Furthermore, it is thought that the second block does not form a covalent bond or an ionic bond with silica.

Due to such features, the present technology can provide a novel silica-dispersed rubber composition capable of realizing excellent rubber physical properties such as low rolling resistance, even when a silica (excluding the composite silica) and/or a silane coupling agent typically contained in a diene rubber composition is not used or the amount thereof is reduced.

The first block of the block copolymer used in the rubber composition of the present technology has a hydroxyl group derived from a (meth)acrylate having a hydroxyl group and an ester bond. Therefore, if silica is not present in the system when producing the composite silica, the block copolymer (or the first block) will ordinarily be dispersed and/or suspended in an organic solvent.

However, in the present technology, silica is present in the system when producing the composite silica, so the block copolymer (or the first block) actually easily covers the surface of the silica rather than being dispersed and/or suspended in the organic solvent. This is because since the silica may have a silanol group and/or a siloxane bond, the block copolymer (or the first block) covers the surface of the silica due to the affinity of the silica and the first block and/or due to the fact that the surface free energy of the composite silica becomes smaller toward the outside. Such covering is presumed to be due to some sort of interaction (for example, hydrogen bonds) between the hydroxyl groups and ester bonds of the block copolymer (or the first block) and the silanol groups and siloxy bonds of the silica and/or the adsorption of the silica and the first block.

Note that even if the mechanism differs from that described above, the mechanism is within the scope of the present technology.

The diene rubber will be described hereinafter. The diene rubber contained in the rubber composition of the present technology is not particularly limited provided it is a substance used in rubber compositions for tires. Examples include aromatic vinyl-conjugated diene copolymer rubber, natural rubber (NR), isoprene rubber (IR), butadiene rubber (BR), acrylonitrile-butadiene copolymer rubber (NBR), butyl rubber (IIR), halogenated butyl rubber (Br-IIR, Cl-IIR), and chloroprene rubber (CR). Of these, aromatic vinyl-conjugated diene copolymer rubber, natural rubber (NR), and isoprene rubber (IR) are preferable from the perspectives of excellent grip and excellent abrasion resistance.

Examples of aromatic vinyl-conjugated diene copolymer rubbers include styrene-butadiene copolymer rubber (SBR) and styrene-isoprene copolymer rubber. Of these, a styrene-butadiene copolymer rubber (SBR) is preferable in that the wet grip performance and the durability of the resulting tire are excellent.

The weight average molecular weight of the diene rubber is preferably from 200,000 to 1,000,000 and more preferably from 400,000 to 1,000,000 from the perspective of achieving better rigidity, durability, and abrasion resistance of the obtained tire.

A single diene rubber may be used alone, or two or more types may be used in combination. There is no particular limitation on the production of the diene rubber. Examples thereof include conventionally known products.

The composite silica will be described hereinafter.

In the present technology, the composite silica comprises a block copolymer and silica. The block copolymer comprises a first block obtained by polymerizing a first monomer containing at least a (meth)acrylate having a hydroxyl group and a second block obtained by polymerizing at least one type of a second monomer selected from the group consisting of styrene, derivatives thereof, and isoprene. In addition, the composite silica is produced in an organic solvent in the presence of the silica. One preferred aspect is for the composite silica to be produced in advance prior to being formed into a rubber composition.

In the present technology, the composite is not particularly limited as long as it is in a state in which the block copolymer and silica combine to form a single substance. One preferred aspect of the composite silica is for the first block of the block copolymer to cover part or all of the surface of the silica. A composite (covering) can be formed as a result of the first block being hydrogen bonded and/or adsorbed to the surface of the silica. Adsorption may be physical (for example, physisorption based on intermolecular forces).

The amount of the composite silica is from 10 to 200 parts by mass per 100 parts by mass of the diene rubber and is preferably from 30 to 200 parts by mass, more preferably from 50 to 150 parts by mass, and even more preferably from 50 to 100 parts by mass per 100 parts by mass of the diene rubber from the perspective of achieving better rubber physical properties and better low rolling resistance and wet skid performance.

A single composite silica may be used alone, or two or more types may be used in combination.

The amount of silica in the composite silica is preferably from 50 to 98 mass %, more preferably from 50 to 95 mass %, even more preferably from 51 to 95 mass %, even more preferably from 55 to 95 mass %, and particularly preferably from 70 to 95 mass % of the composite silica.

The amount of the block copolymer in the composite silica is preferably from 2 to 50 mass %, more preferably from 5 to 50 mass %, even more preferably from 5 to 49 mass %, even more preferably from 5 to 45 mass %, and particularly preferably from 5 to 30 mass % of the composite silica from the perspective of achieving better rubber physical properties, better low rolling resistance and affinity with the rubber, and excellent processability.

The first monomer used to form the first block of the block copolymer contains at least a (meth)acrylate having a hydroxyl group. The entire first monomer may be a (meth)acrylate having a hydroxyl group. The (meth)acrylate having a hydroxyl group is not particularly limited as long as it is a compound having a hydroxyl group and a (meth)acrylic acid ester bond. Examples of (meth)acrylates having hydroxyl groups include compounds expressed by the following formula.

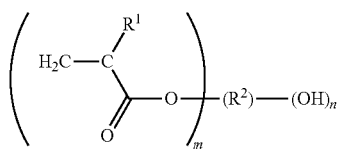

[Formula 1]

In the formula, $R^1$ is a hydrogen atom or a methyl group; $R^2$ is a hydrocarbon group; m is an integer from 1 to 5; n is an integer from 1 to 5; and a hydroxyl group may bind to any of the carbon atoms of $R^2$.

Examples of the hydrocarbon group include aliphatic hydrocarbon groups, alicyclic hydrocarbon groups, aromatic hydrocarbon groups, and combinations thereof. The hydrocarbon group may be a straight-chain or branched group, and may have an unsaturated bond. The hydrocarbon group may contain a hetero atom such as, for example, an oxygen atom, a nitrogen atom, or a sulfur atom, and may form a bond via the hetero atom. Examples of specific hydrocarbon groups include aliphatic hydrocarbon groups such as ethylene groups, trimethylene groups, tetramethylene groups, and 2,2-dimethylpropylene groups; and residues of dipentaerythritol (structures other than hydroxyl groups).

Examples of specific (meth)acrylates having hydroxyl groups include 2-hydroxyethyl(meth)acrylic acid esters, (meth)acrylic acid esters of pentaerythritol, (meth)acrylic acid esters of dipentaerythritol, and hydroxypropyl(meth)acrylic acid esters. Of these, 2-hydroxyethyl(meth)acrylic acid esters and hydroxypropyl(meth)acrylic acid esters are preferable from the perspective of achieving better rubber physical properties, better low rolling resistance, excellent wet skid performance, and low TG (low thermal reduction).

A single (meth)acrylate having a hydroxyl group may be used alone, or two or more types may be used in combination.

The first monomer may further contain another vinyl monomer other than a (meth)acrylate having a hydroxyl group. The other vinyl monomer is not particularly limited as long as it is a compound having a vinyl bond (for example, vinyl groups, vinylene groups, (meth)acryloyl groups, (meth)acryloyloxy groups, and the like). Examples include compounds having vinyl bonds and epoxy groups. The vinyl bonds and epoxy groups may bind to one another via hydrocarbon groups. The hydrocarbon groups are not particularly limited. The same groups as those described above may be used. Specific examples include glycidyl alkyl(meth)acrylates such as glycidyl propyl(meth)acrylic acid esters. A hydroxyl group may be introduced into the first block by copolymerizing another vinyl monomer (for example, a compound having a vinyl bond and an epoxy group) and a (meth)acrylate having a hydroxyl group.

In the present technology, a preferred aspect is for the first block not to have a cationic group (for example, an ammonium group or a quaternary amine).

The second monomer used to form the second block of the block copolymer comprises at least one type selected from the group consisting of styrene, derivatives thereof, and isoprene. Examples of styrenes and derivatives thereof include styrene; styrenes having alkylated benzene rings such as tert-butylstyrene (o-, m-, and p-forms), and vinyltoluene; alkoxystyrenes such as tert-butoxystyrene (o-, m-, and p-forms); acetoxystyrenes (o-, m-, and p-forms); hydroxystyrenes (o-, m-, and p-forms); styrenes having hydroxy groups such as isopropenylphenol (o-, m-, and p-forms); α-alkylated styrenes such as α-methylstyrene; halogenated styrenes such as chlorostyrene (o-, m-, and p-forms); and styrenesulfonic acid (o-, m-, and p-forms) and salts thereof. Of these, styrene, styrenes having alkylated benzene rings (alkyl groups preferably having from 1 to 5 carbon atoms), and alkoxystyrenes (alkoxy groups preferably having from 1 to 5 carbon atoms) are preferable, and styrene, tert-butylstyrene, and tert-butoxystyrene are more preferable from the perspective of achieving better rubber physical properties, better low rolling resistance and affinity with the rubber, and excellent processability.

The second monomer may further contain another vinyl monomer other than styrene, a derivative thereof, or isoprene. One preferred aspect of such another vinyl monomer includes a hydrocarbon compound.

The amount of the second monomer is preferably from 20 to 1,000 and more preferably from 50 to 800 parts by mass per 100 parts by mass of the first monomer (or (meth)acrylate having a hydroxyl group) from the perspective of achieving better rubber physical properties, better low rolling resistance and affinity with the rubber, and excellent processability.

The number average molecular weight of the block copolymer forming the composite silica is preferably from 1,000 to 1,000,000 and more preferably from 10,000 to 700,000 from the perspective of achieving better rubber physical properties, better low rolling resistance and affinity with the rubber, and excellent processability.

The molecular weight distribution of the block copolymer forming the composite silica is preferably from 1.0 to 3.0, more preferably from 1.1 to 3.0, and even more preferably from 1.1 to 2.0 from the perspective of achieving better rubber physical properties, better low rolling resistance and affinity with the rubber, and excellent processability.

The content of the first block in the block copolymer is preferably from 5 to 60 mass % and more preferably from 5 to 50 mass % of the block copolymer.

The content of the second block in the block copolymer is preferably from 40 to 95 mass % and more preferably from 50 to 95 mass % of the block copolymer. In the present technology, the content of each block in the block copolymer can be specified by the weights of the monomers used at the time of the start of the polymerization reaction.

From the perspective of achieving better rubber physical properties and excellent processability, the combination of the diene rubber and the block copolymer of the composite silica is preferably a combination of at least one type of diene rubber selected from the group consisting of aromatic vinyl-conjugated diene copolymer rubber, natural rubber, and isoprene rubber and a block copolymer having a second block obtained by polymerizing a second monomer containing at least one type selected from the group consisting of styrene, derivatives thereof, and isoprene. A combination of an aromatic vinyl-conjugated diene copolymer rubber serving as a diene rubber and a block copolymer having a second block obtained by polymerizing a second monomer containing at least styrene and/or a derivative thereof; and a combination of a natural rubber (NR) and/or an isoprene rubber (IR) serving as a diene rubber and a block copolymer having a second block obtained by polymerizing a second monomer containing at least isoprene are preferable.

The production method of the composite silica will be described hereinafter.

In the present technology, the composite silica is produced in an organic solvent in the presence of the silica.

The silica used when producing the composite silica is not particularly limited. Examples thereof include conventionally known product. Examples include wet silica, dry silica, fumed silica, and diatomaceous earth. A preferred aspect is for the silica used in the production of the composite silica have a silanol group from the perspective of facilitating the formation of hydrogen bonds or the like with the hydroxyl groups and ester bonds of the first block and facilitating the covering of the surface of the silica with the first block.

The average particle size of the silica is preferably from 0.007 to 30 μm.

The amount of the silica used when producing the composite silica is preferably from 100 to 1,000 parts by mass, more preferably from 100 to 600 parts by mass, and even more preferably from 150 to 500 parts by mass per 100 parts by mass of the first monomer (or (meth)acrylate having a hydroxyl group) from the perspective of achieving better rubber physical properties, better low rolling resistance and abrasion resistance, and excellent processability.

In the present technology, the organic solvent used in the production of the composite silica is not particularly limited. Examples thereof include aromatic hydrocarbons such as benzene and toluene; halogenated hydrocarbons such as methyl chloride, methylene chloride, and 1,2-dichloroethane; nitro compounds such as nitromethane and nitroethane; saturated hydrocarbons such as hexane, heptane, octane, and nonane; and mixed solvents thereof. The organic solvent is preferably hydrophobic and/or non-polar. Hydrophobic and/or non-polar aromatic hydrocarbons, halogenated hydrocarbons, nitro compounds, saturated hydrocarbons, and mixed solvents thereof are more preferable, and hexane, cyclohexane, and toluene are even more preferable.

The amount of the organic solvent used in the production of the composite silica is preferably from 50 to 100,000 parts by mass and more preferably from 100 to 5,000 parts by mass per 100 parts by mass of the first monomer (or (meth)acrylate having a hydroxyl group) or the block copolymer from the perspective of achieving better rubber physical properties.

In the present technology, examples of methods for producing the composite silica in an organic solvent in the presence of silica include the following two methods.

The first method is a method of producing the composite silica by polymerizing the block copolymer in the organic solvent in the presence of silica. Specifically, the first monomer should be polymerized in the organic solvent in the presence of silica.

The first block has a hydroxyl group derived from a (meth)acrylate having a hydroxyl group. Therefore, if silica is not present in the system, the first block will ordinarily be dispersed and/or suspended in the organic solvent.

However, in this method, silica is present in the system, so the first block actually easily covers the surface of the silica rather than being dispersed and/or suspended in the organic solvent. This is because it is thought that since the silica has a silanol group and/or a siloxane bond, the first block covers the surface of the silica due to the affinity of the silica and the first block and/or due to the fact that the surface free energy of the composite silica becomes smaller toward the outside. Such covering is presumed to be due to some sort of interaction (for example, hydrogen bonds) between the hydroxyl groups and ester bonds of the first block and the silanol groups and siloxane bonds of the silica and/or the adsorption of the silica and the first block.

The amount of the organic solvent used in the production of the composite silica in the first method is the same as described above.

A second monomer may be polymerized after the first block is formed by polymerizing the first monomer.

A specific example of a production method of the composite silica (first method described above) includes a method of producing the composite silica by first forming a first block by polymerizing a first monomer by means of polymerization in an organic solvent in the presence of silica (first block forming step) and then forming a second block by polymerizing a second monomer (second block forming step). Polymerization is preferably living radical polymerization.

<First Block Forming Step>

First, in the first block forming step, the first block of the block copolymer can be formed by polymerizing a first monomer in an organic solvent in the presence of silica.

The organic solvent, the first monomer, and the silica used in this step are synonymous with those described above. A preferred aspect is for the organic solvent to be hydrophobic and/or non-polar from the perspective of making it easy to cover the silica with the first block. The amount of the organic solvent may be from 50 to 100,000 parts by mass per 100 parts by mass of the first monomer (or (meth)acrylate having a hydroxyl group).

In the first block forming step, the first block of the block copolymer is formed by the polymerization of at least a first monomer containing at least a (meth)acrylate having a hydroxyl group in the organic solvent in the presence of silica.

The timing with which the first block covers the surface of the silica is not particularly limited. For example, the first block may successively cover the surface of the silica during or after the formation of the first block (that is, during or after the first block forming step), or the first block may cover the surface of the silica during or after the formation of the second block (that is, during or after the second block forming step). One preferred aspect is for the first block to successively cover the surface of the silica during or after the formation of the first block.

<Second Block Forming Step>

In the second block forming step following the first block forming step, a composite silica can be produced by adding a second monomer to the system and polymerizing the second monomer from the active terminal of the first block so as to form a second block of the block copolymer. Polymerization is preferably living radical polymerization.

The second block that is formed may have a form which spreads throughout the organic solvent from the surface of the composite silica. The second block may be a chain or branched block. One preferred aspect is for the second block not to cover the surface of the silica.

After the second block forming step, the composite silica may be isolated as necessary by filtering the composite silica from the mixture, washing with toluene or the like, and drying.

The second method is a method of producing the composite silica by mixing the silica and the block copolymer in the organic solvent.

The amount of the organic solvent used in the production of the composite silica in the second method is preferably from 100 to 10,000 parts by mass and more preferably from 500 to 5,000 parts by mass per 100 parts by mass of the block copolymer from the perspective of achieving better rubber physical properties.

A specific example of the other production method for the composite silica (second method described above) is a production method comprising a polymerization step of producing a block copolymer and a mixing step of mixing the block copolymer produced by the polymerization step and the silica in an organic solvent.

<Polymerization Step>

In this production method, a block copolymer is first produced in the polymerization step by performing polymerization using first and second monomers. Polymerization is preferably living radical polymerization.

The first and second monomers are synonymous with those described above.

The order in which the first and second monomers are polymerized is not particularly limited. The second monomer may be polymerized after the first monomer is polymerized. The order may also be reversed.

<Mixing Step>

Next, in the mixing step, a composite silica is obtained by mixing the block copolymer produced by the polymerization step and the silica in an organic solvent.

The silica and the organic solvent are the same as those described above.

The silica may be added to the system of the block copolymer produced by the polymerization step (which may include the organic solvent), and these may be mixed. The organic solvent may also be added to this separately.

The method of mixing is not particularly limited. An example thereof is a conventionally known stirring device or mixing device.

The mixing temperature is preferably from 10 to 120° C. and more preferably from 20 to 80° C.

After the mixing step, the composite silica may be isolated as necessary by filtering the composite silica from the mixture, washing with toluene or the like, and drying.

In the present technology, one preferred aspect is for the block copolymer to be produced by living radical polymerization from the perspective of achieving better rubber physical properties.

<Living Radical Polymerization>

Examples of living radical polymerization include reversible addition-fragmentation chain transfer polymerization (RAFT), atom transfer radical polymerization (ATRP), and polymerization using a nitroxyl radical (NMP). (RAFT polymerization)

The polymerization initiator used in RAFT polymerization is not particularly limited as long as it is a compound capable of initiating the polymerization of a monomer having a vinyl group. Examples include perester initiators such as cumyl peroxyneodecanoate; dicarbonate initiators such as di-sec-butylperoxydicarbonate; diacyl initiators such as isobutyryl peroxide; and azo initiators such as 2,2'-azobisisobutyronitrile, 2,2'-azobis(2,4-dimethylvaleronitrile) and 2,2'-azobis(4-methoxy-2,4-dimethylvaleronitrile). Of these, azo initiators are preferable from the perspective of having excellent stability since they are carbon radicals which have few side reactions such as a hydrogen abstraction reaction from the solvent or the like and are unlikely to undergo induced degradation, and 2,2'-azobis(4-methoxy-2,4-dimethylvaleronitrile) and 2,2'-azobisisobutyronitrile are more preferable.

A single polymerization initiator may be used alone, or two or more types may be used in combination. The amount of the polymerization initiator used in RAFT polymerization may be from 0.00001 to 1 mol % of the number of moles of the first monomer (or (meth)acrylate having a hydroxyl group).

Examples of chain transfer agents (RAFT agents) used in RAFT polymerization include dithioesters; dithiocarbamates; trithiocarbonates such as benzyl octadecyl trithiocarbonate, cyanomethyl dodecyl trithiocarbonate, and 2-(dodecylthiocarbonothioylthio)-2-methylpropionic acid; and thiocarbonylthio compounds such as xanthate. Of these, trithiocarbonates are preferable from the perspective that the chain transfer constant is large, and benzyl octadecyl trithiocarbonate, cyanomethyl dodecyl trithiocarbonate, and 2-(dodecylthiocarbonothioylthio)-2-methylpropionic acid are more preferable.

A single RAFT agent may be used alone, or two or more types may be used in combination. The amount of the RAFT agent may be from 0.0001 to 10 mol % of the number of moles of the first monomer (or (meth)acrylate having a hydroxyl group) from the perspective of having excellent molecular weight controllability, silica surface adsorption efficiency, and the like. (ATRP)

Atom transfer radical polymerization is a method of polymerizing a monomer having a vinyl group (for example, a (meth)acrylic monomer or a styrene monomer) in the presence of a catalyst (transition metal complex) and a polymerization initiator (organic halide).

Examples of transition metals constituting the catalyst (transition metal complex) include Cu, Ru, Fe, Rh, V, Ni, and halides thereof. Examples of ligands coordinated in the transition metal include bipyridyl derivatives including bipyridyl, mercaptan derivatives, trifluorate derivatives, and tertiary alkylamine derivatives. Of these, copper chloride (I) complexed with dinonylbipyridyl [Cu(I)Cl/dNbipy$_2$], copper chloride (I) complexed with bipyridyl [Cu(I)Cl/bipy$_2$], and the like are preferable from the perspective of having excellent solubility in non-polar solvents. A single catalyst may be used alone, or two or more types may be used in combination. The amount of the catalyst may be from 0.0001 to 100 mol % of the number of moles of the first monomer (or (meth)acrylate having a hydroxyl group) from the perspective of having excellent molecular weight controllability, silica surface adsorption efficiency, and the like.

Examples of polymerization initiators (organic halides) include methyl 2-bromo(or chloro)propionate, ethyl 2-bromo(or chloro)propionate, methyl 2-bromo(or chloro)-2-methylpropionate, ethyl 2-bromo(or chloro)-2-methylpropionate (ethyl 2-bromo(or chloro)-isobutyrate), 2-hydroxyethyl 2-bromo(or chloro)propionate, 4-hydroxybutyl 2-bromo(or chloro)propionate, 2-hydroxyethyl 2-bromo(or chloro)-2-methylpropionate, and 4-hydroxybutyl 2-bromo (or chloro)-2-methylpropionate. Of these, ethyl 2-bromo(or chloro)-2-methylpropionate is preferable from the perspective of being inexpensive and having excellent solubility in organic solvents. A single polymerization initiator (organic halide) may be used alone, or two or more types may be used in combination. The amount of the polymerization initiator (organic halide) may be from 0.0001 to 10 mol % of the number of moles of the first monomer (or (meth)acrylate having a hydroxyl group) from the perspective of having excellent molecular weight controllability.

Examples of the NMP initiator used in polymerization using a nitroxyl radical include 2,2,6,6-tetramethyl-1-piperidinyloxy, free radicals (TEMPO), TEMPO methacrylate, 2,2,5-trimethyl-4-phenyl-3-azahexane-3-nitroxide, N-tert-butyl-o-[1-[4-(chloromethyl)phenyl]ethyl]-N-(2-methyl-1-phenylpropyl)hydroxyl amine, and N-tert-butyl-N-(2-methyl-1-phenylpropyl)-o-(1-phenylethyl)hydroxylamine.

In the present technology, the organic solvent used in polymerization (for example, living radical polymerization) is not particularly limited. Examples include the same organic solvents as those used when producing the composite silica. The organic solvent used in polymerization may be designated as the organic solvent used when producing the composite silica. In addition, the organic solvent used in polymerization and the organic solvent used when producing the composite silica may be the same or different.

The temperature of living radical polymerization may be set to −120 to +180° C.

After living radical polymerization, polymerization may be terminated by adding alcohol, for example, to the reaction solution.

In the present technology, one preferred aspect is not to employ a method using water in the production of the composite silica (for example, a phase transfer method, a method of mixing silica and the block copolymer in water, or an aqueous dispersion of silica or the block copolymer).

The rubber composition of the present technology may further contain a filler (excluding the composite silica). The filler that the rubber composition of the present technology may further contain is not particularly limited. Examples include inorganic fillers such as silica, talc, calcium carbonate, and mica. Of these, silica is preferable from the perspective of achieving better rubber physical properties and excellent dispersibility. The silica may be the same as that used in the production of the composite silica.

The amount of the filler is preferably from 0 to 300 parts by mass and more preferably from 0 to 200 parts by mass per 100 parts by mass of the composite silica from the perspective of achieving better rubber physical properties, better low rolling resistance and abrasion resistance, and excellent process ability.

When the composite silica and a silica (excluding the composite silica) are used in combination, the total amount of the composite silica and the silica is preferably from 30 to 200 parts by mass, more preferably from 50 to 150 parts by mass, and even more preferably from 50 to 100 parts by mass per 100 parts by mass of the diene rubber from the perspective of achieving better rubber physical properties and better low rolling resistance and wet skid performance.

When the rubber composition of the present technology further contains silica, the silica (not the composite silica) and a silane coupling agent may also be used in combination. Examples of silane coupling agents include sulfur-containing silane coupling agents, amine silane coupling agents, epoxy silane coupling agents, and methacryloxy silane coupling agents. Of these, sulfur-containing silane coupling agents are preferable. Examples of sulfur-containing silane coupling agents include sulfide-based silane coupling agents such as bis-(3-triethoxysilylpropyl)tetrasulfide, bis-(3-triethoxysilylpropyl)disulfide and 3-trimethoxysilyl-propyl benzothiazole tetrasulfide; mercaptan-based silane coupling agents such as γ-mercaptopropyl triethoxysilane; and thioester-based silane coupling agents such as 3-octanoylthiopropyl triethoxysilane. A single silane coupling agent may be used alone, be used alone, or two or more types may be used in combination. The amount of the silane coupling agent is preferably from 0 to 20 parts by mass and more preferably from 0 to 15 parts by mass per 100 parts by mass of the silica (excluding the composite silica).

The rubber composition of the present technology may further contain additives as necessary within a scope that does not inhibit the effect or purpose thereof. Examples of additives include additives that are typically used in rubber compositions for tires, such as carbon black, zinc oxide (zinc white), stearic acid, antiaging agents, processing aids, aroma oils, process oils, liquid polymers, terpene resins, thermo-setting resins, vulcanizing agents (for example, sulfur), and vulcanization accelerators.

The method for producing the rubber composition for a tire of the present technology is not particularly limited, and specific examples thereof include a method whereby each of the above-mentioned components is kneaded using a publicly known method and device (for example, Banbury mixer, kneader, roller, and the like).

In addition, the composition of the present technology can be vulcanized or crosslinked under publicly known vulcanizing or crosslinking conditions.

In the rubber composition of the present technology, one preferred aspect is for the second block of the composite silica to be dispersed in a diene rubber. This makes it possible for the composite silica to be dispersed well in the composition, which is preferable in that the agglomeration of the composite silica is suppressed. In the present technology, the statement that "the second block is dispersed in a diene rubber" refers to a state in which the second block extends from the surface of the composite silica and mixes with the matrix of the diene rubber.

Examples of applications of the rubber composition of the present technology include conveyor belts and base isolation rubber.

The pneumatic tire of the present technology will be described hereinafter.

The pneumatic tire of the present technology is a pneumatic tire produced by using the rubber composition for a tire according to the present technology.

In the pneumatic tire of the present technology, the rubber composition for a tire according to the present technology may be used for any portion formed from rubber. Of these, one preferred aspect is for the rubber composition for a tire according to the present technology to be used in a tire tread portion (cap).

Figure 4:
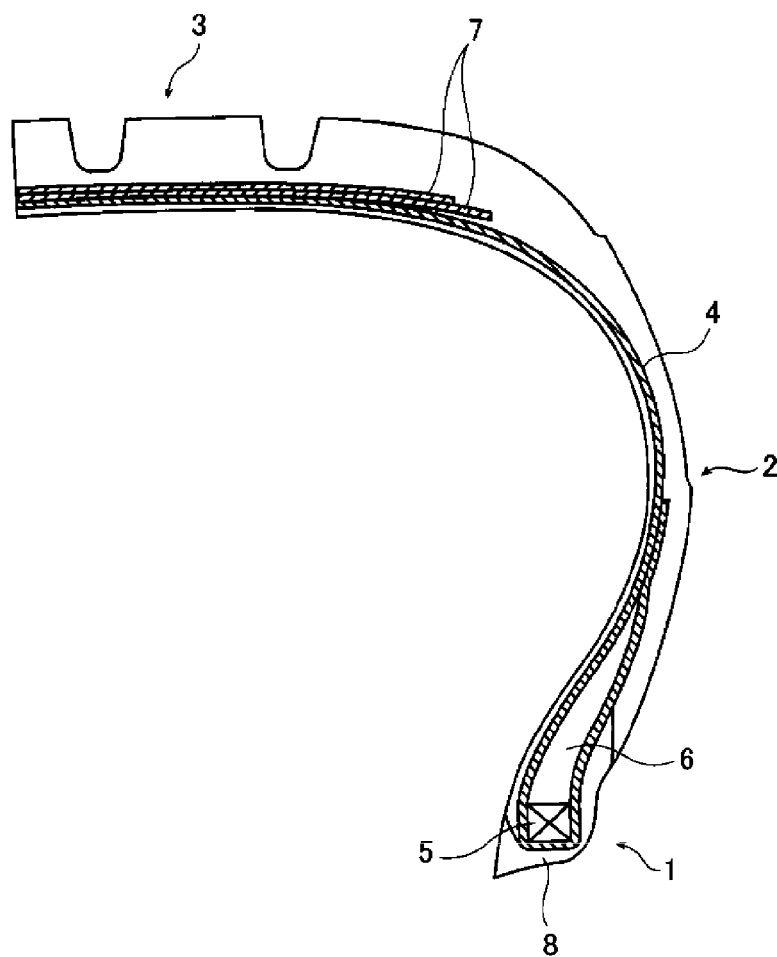
FIG. 4 is a partial cross-sectional view schematically representing an example of an embodiment of the pneumatic tire of the present technology.

FIG. 4 is a partial cross-sectional view schematically illustrating an example of an embodiment of the pneumatic tire of the present technology. The pneumatic tire of the present technology is not limited to the attached drawings.

In FIG. 4, reference number 1 denotes a bead portion, reference number 2 denotes a side wall portion, and reference number 3 denotes a tire tread portion (cap).

In addition, a carcass layer 4, in which a fiber cord is embedded, is mounted between a left-right pair of bead portions 1, and ends of the carcass layer 4 are wound by being folded around bead cores 5 and a bead filler 6 from an inner side to an outer side of the tire.

In addition, in the tire tread 3, a belt layer 7 is provided on the outer side of the carcass layer 4.

Additionally, rim cushions 8 are provided in parts of the bead portions 1 that are in contact with a rim.

The pneumatic tire of the present technology can be produced, for example, in accordance with a conventionally known method. In addition to ordinary air or air with an adjusted oxygen partial pressure, inert gases such as nitrogen, argon, and helium can be used as the gas with which the tire is filled.

The rubber composition and the pneumatic tire of the present technology have excellent rubber physical properties such as low rolling resistance, fracture characteristics, impact resilience, or abrasion resistance.

Examples

The present technology will be described in detail hereinafter using working examples. However, the present technology is not limited to such working examples.

<Composite Silica Production 1: Combination Concurrent to Polymerization>

Composite silicas produced as described below are used as composite silicas Run-0 and 1 to 8 (see Table 1).

(When Living Radical Polymerization is RAFT Polymerization)

First, 10 g of silica (trade name: Zeosil1165MP, manufactured by Rhodia; average particle size: 20 μm; N2SA: 160 m²/g; same hereafter) was placed in a 300 mL eggplant flask and transferred to a glove box. Inside the glove box, a solution was prepared separately by mixing the polymerization initiator shown in Table 1 (V-70: 2,2'-azobis(4-methoxy-2,4-dimethylvaleronitrile), 0.005 g; manufactured by Wako Pure Chemical Industries, Ltd.), 0.02 g of a RAFT agent (benzyl octadecyl trithiocarbonate, manufactured by Aldrich), the first monomer shown in Table 1 (2-hydroxyethyl acrylate, 2 g: HEA, manufactured by Wako Pure Chemical Industries, Ltd.; 2-hydroxyethyl methacrylate, 2.2 g: HEMA, manufactured by Wako Pure Chemical Industries, Ltd.; same hereafter), and the organic solvent shown in Table 1 (when one type of organic solvent is used, 50 g of this solvent). The solution was placed in the eggplant flask, and living radical polymerization was performed for six hours at 40° C. (formation of the first block of the block copolymer and the covering of the silica with the first block). After six hours, a mixed solution of the second monomer shown in Table 1 (8 g in the case of styrene; 6.8 g in the case of isoprene; same hereafter) and 12 g of the organic solvent shown in Table 1 (12 g of toluene in the case of Run-0) was added to the eggplant flask, and living radical polymerization was performed further for 18 hours at room temperature (formation of the second block of the block copolymer). After the termination of polymerization, the eggplant flask was taken out of the glove box, and after unreacted monomers or the like were removed by centrifugal washing using toluene, the resulting composite silica was packed into a 100 mL tetrafluoroethylene/perfluoroalkylvinyl ether copolymer (PFA) bottle.

(When Living Radical Polymerization is ATRP Polymerization)

First, 11 g of silica is placed in a 300 mL eggplant flask and transferred to a glove box. Inside the glove box, a solution was prepared separately by mixing 0.007 g of the polymerization initiator shown in Table 1 (EBIB: ethyl 2-bromoisobutyrate), 0.05 g of copper chloride (I) complexed using bipyridyl (ligand) [Cu(I)Cl/bipy$_2$] serving as a catalyst, 2 g of the first monomer shown in Table 1, and 50 g of the organic solvent shown in Table 1. This solution was placed in the eggplant flask, and living radical polymerization was performed for 12 hours at 80° C. (formation of the first block of the block copolymer and covering of the silica with the first block). After six hours, a mixed solution of 8 g of the second monomer shown in Table 1 and 12 g of the organic solvent shown in Table 1 was added to the eggplant flask, and living radical polymerization was performed further for 8 hours at 80° C. (formation of the second block of the block copolymer). After the termination of polymerization, the eggplant flask was taken out of the glove box, and after unreacted monomers or the like were removed by centrifugal washing using toluene, the resulting composite silica was packed into a 100 mL PFA bottle.

<Composite Silica Production 2: Mixing after Polymerization>

(When Living Radical Polymerization is ATRP Polymerization)

With the exception that silica was not placed in the 300 mL eggplant flask, a block copolymer was produced by performing an experiment in the same manner as in the case of the composite silica Run-1 of the aforementioned composite silica production 1 (when living radical polymerization is ATRP polymerization) up to the point when polymerization is terminated and the eggplant flask is taken out of the glove box. Next, 11 g of silica (trade name: Zeosil1165MP) was added to a cyclohexane mixture containing this block copolymer, and this was stirred for 16 hours under conditions at 40° C. so as to adsorb the block copolymer to the silica. After unreacted monomers or the like were removed by centrifugal washing using toluene, the resulting composite silica was then packed into a 100 mL PFA bottle. The obtained composite silica was used as composite silica Run-1-2.

(When Living Radical Polymerization is RAFT Polymerization)

With the exception that silica was not placed in the 300 mL eggplant flask, a block copolymer was produced by performing an experiment in the same manner as in the case of the composite silica Run-8 of the aforementioned composite silica production 1 (when living radical polymerization is RAFT polymerization) up to the point when polymerization is terminated and the eggplant flask is taken out of the glove box. Next, 10 g of silica was added to a cyclohexane mixture containing this block copolymer, and this was stirred for 16 hours under conditions at 40° C. so as to adsorb the block copolymer to the silica. After unreacted monomers or the like were removed by centrifugal washing using toluene, the resulting composite silica was then packed into a 100 mL PFA bottle. The obtained composite silica was used as composite silica Run-8-2.

TABLE 1

| Composite silica Run | Monomer | | Organic solvent | Silica |
| --- | --- | --- | --- | --- |
| | First monomer | Second monomer | | |
| 0 | HEA | Styrene | 40 g of toluene/ 10 g of methylene chloride | Zeosil 1165MP |
| 1 | HEMA | Styrene | Cyclohexane | |
| 2 | HEMA | Styrene | Toluene | |
| 3 | HEMA | Styrene | Cyclohexane | |
| 4 | HEMA | Styrene | Cyclohexane | |
| 5 | HEMA | Isoprene | Cyclohexane | |
| 6 | HEMA | Isoprene | Toluene | |
| 7 | HEMA | Isoprene | Cyclohexane | |
| 8 | HEA | Isoprene | Cyclohexane | |
| 1-2 | HEMA | Styrene | Cyclohexane | |
| 8-2 | HEA | Isoprene | Cyclohexane | |

| Composite silica Run | Polymerization initiator | Living type | Mn | Mw/Mn |
| --- | --- | --- | --- | --- |
| 0 | V-70 | RAFT | 80000 | 1.24 |
| 1 | EBIB | ATRP | 105000 | 2.21 |
| 2 | EBIB | ATRP | 76000 | 1.34 |
| 3 | EBIB | ATRP | 84000 | 1.25 |
| 4 | V-70 | RAFT | 72400 | 1.17 |
| 5 | EBIB | ATRP | 67200 | 1.19 |
| 6 | EBIB | ATRP | 99500 | 1.82 |
| 7 | EBIB | ATRP | 88000 | 1.15 |
| 8 | V-70 | RAFT | 70400 | 1.10 |
| 1-2 | EBIB | ATRP | 98000 | 2.05 |
| 8-2 | V-70 | RAFT | 71000 | 1.13 |

In Table 1, Mn and Mw/Mn are respectively the number average molecular weight and the molecular weight distribution of the block copolymer. In the present technology, the number average molecular weight and the weight average molecular weight of the block copolymer were measured by gel permeation chromatography (GPC) in terms of standard polystyrene.

FIG. 1 is a photograph taken when observing the silica used to produce a composite silica in a working example of the present technology under a magnification of 4,000× with a transmission electron microscope.

Figure 2:
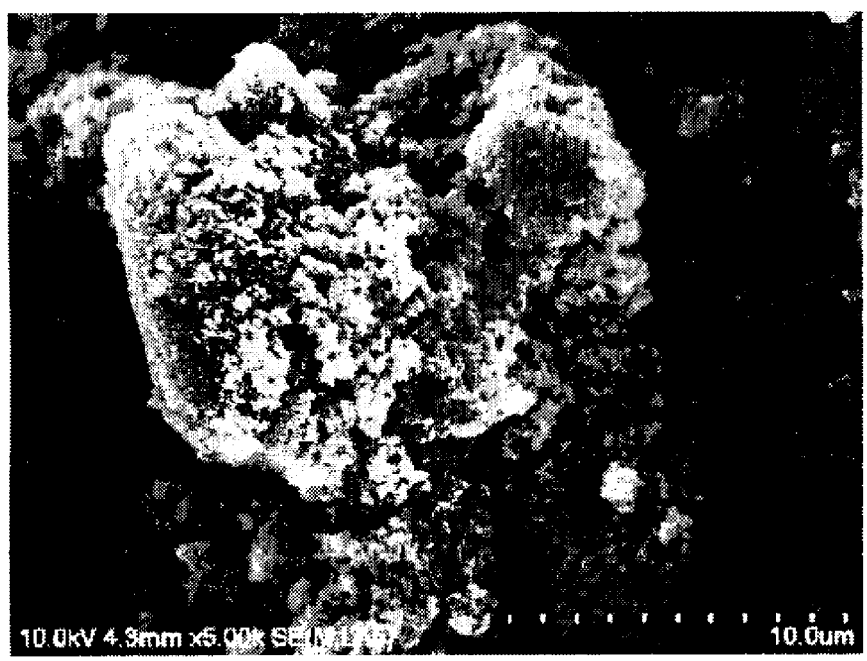
FIG. 2 is a photograph taken when observing a composite silica Run-8 produced in the present technology under a magnification of 5,000× with a transmission electron microscope.

FIG. 2 is a photograph taken when observing a composite silica Run-8 produced in the present technology under a magnification of 5,000× with a transmission electron microscope.

In a comparison of FIGS. 1 and 2, the irregularities of the secondary agglomerate surface of the silica is clearer in FIG. 2, and it is observed that there is an aggregation of primary particles of silica, indicating that the entire surface of the silica is covered by the first block of the block copolymer.

Figure 3:
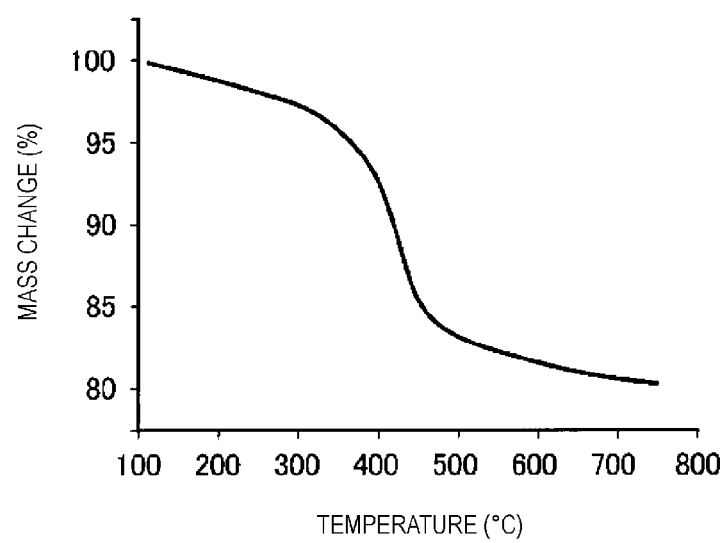
FIG. 3 is a chart showing the results of measuring changes in the mass of a composite silica Run-0 produced in the present technology by thermogravimetric analysis.

FIG. 3 is a chart showing the results of measuring changes in the mass of the composite silica Run-0 produced in the present technology by thermogravimetric analysis (TG).

In the present technology, a TG8120 thermal analyzer (manufactured by the Rigaku Corporation) was used for the TG measurements, and the measurement conditions were as follows. Flow gas type: Ar; flow gas flow rate: 50 mL/min; initial sample amount: 10 mg; heating rate: 10° C./min; temperature range: room temperature to 750° C.

As is clear from the results shown in FIG. 3, the amount of silica in the composite silica Run-0 produced in the present technology was approximately 80 mass %, and the amount of the block copolymer was approximately 20 mass %.

In addition, as a result of measuring the reduction rate in the same manner as described above for composite silicas Run-1 and 8, the amount of silica in the composite silica Run-1 was approximately 78 mass %, and the amount of the block copolymer was approximately 22 mass %. In addition, the amount of silica in the composite silica Run-8 was approximately 75 mass %, and the amount of the block copolymer was approximately 25 mass %.

<Production of Rubber Composition>

The components shown in Table 2 were used and mixed in the amounts shown in the table (units: parts by mass). Next, 2 parts by mass of sulfur (oil-treated sulfur manufactured by Karuizawa Refinery Ltd.) was added to this and mixed further to produce a rubber composition.

In addition, in Table 2, Examples 2, 4, 6, 8, 10, 11, 12, 14, 16, 18, 20, 21, and 22 containing prescribed composite silicas are working examples. Examples 1, 3, 5, 7, 9, 13, 15, 17, 19, 23, 24, and 25 not containing prescribed composite silicas are comparative examples. The numbers at the very top of Table 2 are the numbers of each of the examples.

The details of each component shown in Table 2 are as follows.

Diene rubber 1: styrene-butadiene rubber (SBR1502, manufactured by the Zeon Corporation)
Diene rubber 2: natural rubber (NR RSS#3)
Silica: trade name Zeosil 1165MP, manufactured by Rhodia; average particle size: 20 μm; N2SA: 160 m$^2$/g
Composite silica 1: composite silica Run-1 produced as described above
Composite silica 2: composite silica Run-8 produced as described above
Composite silica 3: composite silica Run-1-2 produced as described above
Composite silica 4: composite silica Run-8-2 produced as described above
Silane coupling agent: compound name bis(3-(triethoxysilyl-propyl)-tetrasulfide; trade name: Si-69, manufactured by Evonik Degussa
Block copolymer 1: HEMA-styrene block copolymer: number average molecular weight: 105,000; HEMA block content: 34 mass % of the copolymer <Production of Vulcanized Rubber>

The rubber composition produced as described above was press-vulcanized for 20 minutes at 160° C. in a prescribed die to produce a vulcanized rubber (thickness: 2 mm).

<Evaluations>

The following evaluations were performed on the vulcanized rubber produced as described above. The results are shown in Table 2.

Measurement of Modulus, Fracture Strength at Break (TB), and Elongation at Break (EB)

A JIS (Japanese Industrial Standard) No. 3 dumbbell-shaped test piece was punched out from the vulcanized rubber, and a tensile test was performed at a tensile speed of 500 mm/min in accordance with JIS K 6251. The modulus (M50, M100, M200, M300, and M400; units: MPa), fracture strength at break (units: MPa), and the elongation at break (unit %) of the vulcanized rubber test piece were measured at room temperature. When the modulus of a rubber composition containing silica increases, the TB and EB typically decrease. In the present technology, TB and TB preferably increase together with the modulus.

Measurement of Tan δ

The value of tan δ was measured for the vulcanized rubber using a viscoelastic spectrometer manufactured by Iwamoto Seisakusho Co. Ltd. at an elongation deformation distortion factor of 10±2%, a vibration frequency of 20 Hz, and a temperature of 0° C., 20° C., 40° C., or 60° C.

A lower value of tan δ indicates lower heat build-up. In particular, a smaller value of tan δ (60° C.) indicates superior low rolling resistance.

A larger value of tan δ (0° C.) indicates superior wet skid performance.

Impact Resilience

A Leupke impact resilience test was performed in a thermostatic chamber for the vulcanized rubber in accordance with JIS K 6255:1996, and the impact resilience was measured under conditions with a thermostatic chamber temperature of 0° C., 20° C., 40° C., or 60° C. A larger index of impact resilience at 40° C. indicates better rolling resistance (low rolling resistance).

Lambourn Abrasion Index

The amount of wear of the obtained vulcanized rubber was measured in accordance with JIS K6264, using a Lambourn abrasion test machine (manufactured by Iwamoto Seisakusho Co. Ltd.) under the following conditions: temperature=20° C., load=15 N, slip rate 50%, time=10 minutes. Further, the volumetric loss was calculated from the measured Lambourn abrasion, and the volumetric loss of each example was displayed as an index using the following formula with the Lambourn abrasion index of Example 3 defined as 100. A larger Lambourn abrasion index indicates superior abrasion resistance. The Lambourn abrasion index typically has a trade-off relationship with tan δ and the impact resilience.

Lambourn abrasion index=[(volumetric loss of Example 3)/(volumetric loss of each example)]×100

Payne Effect

Using the vulcanized rubber produced as described above, the shear stress G' (0.56%) at a strain of 0.56% and the shear stress G' (100%) at a strain of 100% were measured using an RPA2000 (shear stress measurement instrument manufactured by Alpha Technologies) in accordance with ASTM D6204, and the difference (absolute value) between G' (0.56%) and G' (100%) was calculated.

The results are displayed as an index with the value of Example 1 being defined as 100. A smaller index indicates a smaller Payne effect and better dispersibility of the silane (silica).

Bound Rubber

First, 0.5 g of an unvulcanized rubber composition was placed in a metal mesh basket, and after the composition was immersed for 72 hours in 300 mL of toluene at room temperature, it was retrieved and dried. The mass of the sample was measured, and the amount of bound rubber was calculated from the following formula.

Amount of bound rubber=[(sample mass after toluene immersion and drying)−(silica mass)]/(rubber component mass)

The results are displayed as an index with the value of Example 1 being defined as 100. A larger index indicates a larger amount of bound rubber, which means that the dispersibility of the silica is improved and/or that the silica and the block copolymer are combined (adsorbed) since the agglomeration of silica can be prevented.

TABLE 2

|  | 1 | 2 | 3 | 4 | 5 | 6 | 7 |
|---|---|---|---|---|---|---|---|
| Diene rubber 1 | 100 | 100 | 100 | 100 | 100 | 100 | 100 |
| Diene rubber 2 | | | | | | | |
| Silica | 35 | | 50 | | 70 | | 100 |
| Composite silica 1 | | 35 | | 50 | | 70 | |
| Composite silica 2 | | | | | | | |
| Composite silica 3 | | | | | | | |
| Composite silica 4 | | | | | | | |
| Silane coupling agent | 3 | | 4 | | 6 | | 10 |
| Block copolymer 1 | | | | | | | |
| M50 | 1.1 | 1.2 | 1.4 | 1.4 | 1.6 | 1.6 | 1.8 |
| M100 | 1.7 | 2.1 | 2.6 | 2.7 | 2.9 | 3.1 | 3.1 |
| M200 | 4.3 | 4.8 | 6.9 | 7.2 | 7.2 | 7.5 | 7.7 |
| M300 | 8.8 | 9.8 | 11.5 | 12.5 | 13.6 | 13.2 | 14.2 |
| M400 | 12.8 | 13.4 | 13.9 | 15.6 | — | 18.7 | — |
| TB | 13.4 | 15.5 | 16.6 | 17.6 | 18.3 | 22.4 | 19.8 |
| EB | 466 | 450 | 402 | 443 | 387 | 487 | 366 |
| tan δ (0° C.) | 0.46 | 0.43 | 0.44 | 0.42 | 0.431 | 0.421 | 0.401 |
| tan δ (20° C.) | 0.34 | 0.31 | 0.3 | 0.26 | 0.279 | 0.234 | 0.267 |
| tan δ (40° C.) | 0.24 | 0.22 | 0.2 | 0.13 | 0.198 | 0.123 | 0.178 |
| tan δ (60° C.) | 0.18 | 0.18 | 0.15 | 0.11 | 0.149 | 0.1 | 0.11 |
| Impact resilience (0° C.) | 17.6 | 17.9 | 18.6 | 22.5 | 19.1 | 25.4 | 19.3 |
| Impact resilience (20° C.) | 36 | 38.9 | 38.7 | 47.6 | 40.1 | 50.5 | 42.3 |
| Impact resilience (40° C.) | 47.7 | 52.4 | 52.7 | 58.9 | 54 | 63.4 | 55.5 |
| Impact resilience (60° C.) | 54.9 | 58.8 | 59.7 | 64.3 | 62.5 | 69.9 | 62.8 |
| Lambourn abrasion index | 98 | 100 | 100 | 105 | 101 | 105 | 106 |
| Payne Effect | 100 | 88 | 101 | 86 | 105 | 78 | 105 |
| Bound rubber | 100 | 125 | 135 | 160 | 200 | 270 | 280 |

|  | 8 | 9 | 10 | 11 | 12 | 23 | 24 |
|---|---|---|---|---|---|---|---|
| Diene rubber 1 | 100 | 100 | 100 | 100 | 100 | 100 | 100 |
| Diene rubber 2 | | | | | | | |
| Silica | | 120 | | 35 | | 75 | |
| Composite silica 1 | 100 | | 120 | 35 | | | |
| Composite silica 2 | | | | | | | |
| Composite silica 3 | | | | | 75 | | |
| Composite silica 4 | | | | | | | |
| Silane coupling agent | | 10 | | 3 | | 6 | |
| Block copolymer 1 | | | | | | | 25 |
| M50 | 2.1 | 2.8 | 2.8 | 1.7 | 1.6 | 1.7 | 1 |
| M100 | 3.5 | 4.1 | 4.2 | 3.2 | 2.9 | 2.9 | 1.3 |
| M200 | 8.7 | 9.5 | 9.6 | 7.8 | 7.2 | 7.3 | 2.9 |
| M300 | 15.4 | 16.7 | 17.8 | 13.7 | 13.5 | 14.6 | 7.8 |
| M400 | 19.8 | — | — | 19.5 | — | — | 9.7 |
| TB | 22.1 | 20.1 | 19.8 | 20.3 | 20.8 | 17.9 | 10.6 |
| EB | 446 | 350 | 344 | 455 | 389 | 367 | 411 |
| tan δ (0° C.) | 0.4 | 0.38 | 0.36 | 0.444 | 0.433 | 0.441 | 0.43 |
| tan δ (20° C.) | 0.222 | 0.255 | 0.202 | 0.255 | 0.279 | 0.278 | 0.36 |
| tan δ (40° C.) | 0.156 | 0.165 | 0.145 | 0.155 | 0.177 | 0.2 | 0.28 |
| tan δ (60° C.) | 0.096 | 0.1 | 0.096 | 0.122 | 0.123 | 0.151 | 0.21 |
| Impact resilience (0° C.) | 26.7 | 20.5 | 30.1 | 22.1 | 21.2 | 18.9 | 17.6 |
| Impact resilience (20° C.) | 44.4 | 44.4 | 48.9 | 48.7 | 44.4 | 38.9 | 33.5 |
| Impact resilience (40° C.) | 59.8 | 58.9 | 63.4 | 58.9 | 59.2 | 52.9 | 46.7 |

TABLE 2-continued

|  | | | | | | | |
|---|---|---|---|---|---|---|---|
| Impact resilience (60° C.) | 65.6 | 64.5 | 68.9 | 65.6 | 67.1 | 60.8 | 48.7 |
| Lambourn abrasion index | 106 | 96 | 96 | 104 | 101 | 98 | 100 |
| Payne Effect | 75 | 104 | 76 | 80 | 87 | 101 | 87 |
| Bound rubber | 350 | 380 | 490 | 120 | 290 | 225 | 101 |

|  | 13 | 14 | 15 | 16 | 17 | 18 |
|---|---|---|---|---|---|---|
| Diene rubber 1 | | | | | | |
| Diene rubber 2 | 100 | 100 | 100 | 100 | 100 | 100 |
| Silica | 25 | | 50 | | 100 | |
| Composite silica 1 | | | | | | |
| Composite silica 2 | | 25 | | 50 | | 100 |
| Composite silica 3 | | | | | | |
| Composite silica 4 | | | | | | |
| Silane coupling agent | 3 | | 4 | | 10 | |
| Block copolymer 1 | | | | | | |
| M50 | 1 | 1.1 | 1.1 | 1.1 | 1.6 | 1.8 |
| M100 | 1.7 | 1.7 | 1.8 | 1.8 | 2.3 | 2.4 |
| M200 | 3.5 | 3.6 | 4.1 | 5.6 | 6.6 | 7.3 |
| M300 | 6.7 | 6.7 | 7.8 | 9.7 | 10.3 | 11 |
| M400 | 11.2 | 11.1 | 12.4 | 15.9 | 16.7 | 18.9 |
| TB | 24.5 | 24.0 | 28.7 | 36.4 | 35.5 | 39.8 |
| EB | 710 | 690 | 688 | 766 | 555 | 670 |
| tan δ (0° C.) | 0.15 | 0.14 | 0.123 | 0.13 | 0.1 | 0.12 |
| tan δ (20° C.) | 0.13 | 0.13 | 0.107 | 0.105 | 0.08 | 0.07 |
| tan δ (40° C.) | 0.1 | 0.1 | 0.084 | 0.07 | 0.07 | 0.06 |
| tan δ (60° C.) | 0.09 | 0.09 | 0.079 | 0.06 | 0.07 | 0.05 |
| Impact resilience (0° C.) | 41.4 | 42 | 45.8 | 48 | 46.7 | 50.3 |
| Impact resilience (20° C.) | 56 | 58 | 60 | 60.3 | 60.7 | 65.4 |
| Impact resilience (40° C.) | 61.3 | 62.3 | 65.5 | 68.7 | 67.1 | 70.3 |
| Impact resilience (60° C.) | 64.5 | 67.5 | 68.6 | 70.1 | 72.8 | 76.7 |
| Lambourn abrasion index | 34 | 35 | 46 | 57 | 59 | 67 |
| Payne Effect | 100 | 78 | 101 | 75 | 105 | 72 |
| Bound rubber | 90 | 120 | 170 | 200 | 350 | 420 |

|  | 19 | 20 | 21 | 22 | 25 |
|---|---|---|---|---|---|
| Diene rubber 1 | | | | | |
| Diene rubber 2 | 100 | 100 | 100 | 100 | 100 |
| Silica | 120 | | 25 | | |
| Composite silica 1 | | | | | |
| Composite silica 2 | | 120 | 25 | | 8 |
| Composite silica 3 | | | | | |
| Composite silica 4 | | | | 40 | |
| Silane coupling agent | 10 | | 3 | | |
| Block copolymer 1 | | | | | |
| M50 | 2 | 2.1 | 1.8 | 0.9 | 1 |
| M100 | 2.7 | 2.9 | 4.1 | 1.4 | 1.7 |
| M200 | 7.2 | 7.3 | 5.4 | — | 3.4 |
| M300 | 11.8 | 11.8 | 9.9 | 3.1 | 6.2 |
| M400 | 17.9 | 18 | 14.5 | 11.5 | 10.4 |
| TB | 36.8 | 36.7 | 33.5 | 28.3 | 16.7 |
| EB | 525 | 520 | 723 | 711 | 690 |
| tan δ (0° C.) | 0.1 | 0.11 | 0.125 | 0.121 | 0.15 |
| tan δ (20° C.) | 0.07 | 0.07 | 0.105 | 0.101 | 0.13 |
| tan δ (40° C.) | 0.06 | 0.05 | 0.077 | 0.876 | 0.11 |
| tan δ (60° C.) | 0.05 | 0.05 | 0.069 | 0.067 | 0.09 |
| Impact resilience (0° C.) | 48.9 | 47.9 | 45.4 | 44.3 | 37.8 |
| Impact resilience (20° C.) | 62.3 | 63.2 | 58.2 | 59.8 | 55 |
| Impact resilience (40° C.) | 68.1 | 67.1 | 63.9 | 62.5 | 58 |
| Impact resilience (60° C.) | 73.9 | 72.8 | 67.7 | 68.4 | 60.4 |
| Lambourn abrasion index | 58 | 57 | 56 | 51 | 33 |
| Payne Effect | 105 | 73 | 87 | 95 | 78 |
| Bound rubber | 490 | 610 | 110 | 135 | 105 |

As is clear from the results shown in Table 2, in a comparison of Examples 1 and 2, Example 2 exhibited at least one favorable rubber physical property from among the modulus, TB, EB, tan δ (60° C.), impact resilience (40° C.), and the Lambourn abrasion index. In addition, in Example 2, the Payne effect was small, and the amount of bound rubber was large. This was the same in comparisons of Examples 3 and 4, Examples 5 and 6, Examples 7 and 8, Examples 9 and 10, Examples 1 and 11, Example 5, and Examples 23 and 12.

In a comparison of Examples 2 and 24 (having amounts of composite silica smaller than the prescribed amounts), the modulus, TB, EB, tan δ (60° C.), and impact resilience (40° C.) were better in Example 2 than in Example 24. In addition, the amount of bound rubber was greater in Example 2 than in Example 24.

In addition, in a comparison of Examples 13 and 14, Example 13 exhibited at least one favorable rubber physical property from among the modulus, TB, EB, tan δ (60° C.), impact resilience (40° C.), and the Lambourn abrasion index. In addition, in Example 13, the Payne effect was small, and the amount of bound rubber was large. This was the same in comparisons of Examples 15 and 16, Examples 17 and 18, Examples 19 and 20, and Examples 13 and 21. In a comparison of Examples 14, 22, 16, 18, and 20, the amount of bound rubber was greater when the amount of the composite silica was larger.

In a comparison of Examples 14 and 25 (having amounts of composite silica smaller than the prescribed amounts), the modulus, TB, and impact resilience (40° C.) were better in Example 14 than in Example 25. In addition, the Lambourn abrasion index and the amount of bound rubber were greater in Example 14 than in Example 25.

In this way, the rubber composition for a tire according to the present technology has excellent silica dispersibility and excellent rubber physical properties such as low rolling resistance, modulus, fracture characteristics, or abrasion resistance. In addition, the rubber composition for a tire according to the present technology has excellent rubber physical properties such as low rolling resistance even when the amount of silica (excluding the composite silica) and/or the silane coupling agent are reduced or the silica (excluding the composite silica) and/or the silane coupling agent are not used.

When the amount of the composite silica of the rubber composition for a tire according to the present technology is from 30 to 100 parts by mass per 100 parts by mass of diene rubber, it is possible to increase the fracture strength and/or the elongation at break together with the modulus (Examples 2, 4, 6, 8, and 11; Examples 16, 18, and 21).

In addition, since the rubber composition for a tire according to the present technology reduces the tan δ (60° C.) and the impact resilience (40° C.), the rolling resistance can also sometimes be reduced (Examples 4, 6, 8, 10, 11, and 12; Examples 16, 18, and 21).

The rubber composition for a tire according to the present technology can increase the Lambourn abrasion index, which has a trade-off relationship with decreases in tan δ (60° C.) and increases in impact resilience (40° C.), which may yield excellent abrasion properties (Examples 4, 6, 11, and 12; Examples 16, 18, and 21).

In the rubber composition for a tire according to the present technology, a good balance of the physical properties of the tan δ value, Eb, and Tb was achieved even when silica and/or a silane coupling agent was not used or the amounts thereof were reduced.

The rubber composition for a tire according to the present technology may also achieve both excellent wet characteristics (wet skid performance) by increasing tan δ (0° C.) and excellent low rolling resistance by reducing tan δ (60° C.) (from the results of Examples 16 and 18, the amount of the composite silica is from 50 to 100 parts by mass per 100 parts by mass of natural rubber in combinations of natural rubber and composite silica).

The invention claimed is:

1. A rubber composition for a tire comprising: a diene rubber; and a composite silica comprising a block copolymer and silica, the block copolymer comprising a first block obtained by polymerizing a first monomer containing at least a (meth)acrylate having a hydroxyl group and a second block obtained by polymerizing at least one of a second monomer selected from the group consisting of styrene, derivatives thereof, and isoprene; the composite silica being produced in an organic solvent in the presence of the silica; and an amount of the composite silica being from 10 to 200 parts by mass per 100 parts by mass of the diene rubber, wherein an amount of the block copolymer is from 2 to 50 mass % in the composite silica.

2. The rubber composition for a tire according to claim 1, wherein the first block covers a surface of the silica.

3. The rubber composition for a tire according to claim 1, wherein the second block is dispersed in the diene rubber.

4. The rubber composition for a tire according to claim 1, wherein the first block of the composite silica is adsorbed to a surface of the silica.

5. The rubber composition for a tire according to claim 1, wherein the silica has a silanol group.

6. The rubber composition for a tire according to claim 1, wherein a number average molecular weight of the block copolymer is from 1,000 to 1,000,000.

7. The rubber composition for a tire according to claim 1, wherein a molecular weight distribution of the block copolymer is from 1.1 to 3.0.

8. The rubber composition for a tire according to claim 1, wherein the composite silica is produced by polymerizing the block copolymer in the organic solvent in the presence of the silica or is produced by mixing the silica and the block copolymer in the organic solvent.

9. The rubber composition for a tire according to claim 1, wherein the block copolymer is produced by living radical polymerization.

10. The rubber composition for a tire according to claim 1, wherein the first monomer is polymerized in the organic solvent in the presence of the silica.

11. The rubber composition for a tire according to claim 1, wherein the composite silica is produced by a production method comprising: a polymerization step of producing the block copolymer; and a mixing step of mixing the block copolymer produced by the polymerization step and the silica in the organic solvent.

12. A pneumatic tire comprising the rubber composition for a tire described in claim 1.

13. The rubber composition for a tire according to claim 2, wherein the first block of the composite silica is adsorbed to a surface of the silica.

14. The rubber composition for a tire according to claim 2, wherein the silica has a silanol group.

15. The rubber composition for a tire according to claim 2, wherein a number average molecular weight of the block copolymer is from 1,000 to 1,000,000.

16. The rubber composition for a tire according to claim 2, wherein a molecular weight distribution of the block copolymer is from 1.1 to 3.0.

17. The rubber composition for a tire according to claim 2, wherein the composite silica is produced by polymerizing the block copolymer in the organic solvent in the presence of the silica or is produced by mixing the silica and the block copolymer in the organic solvent.

18. The rubber composition for a tire according to claim 2, wherein the block copolymer is produced by living radical polymerization.

* * * * *